UNITED STATES PATENT OFFICE.

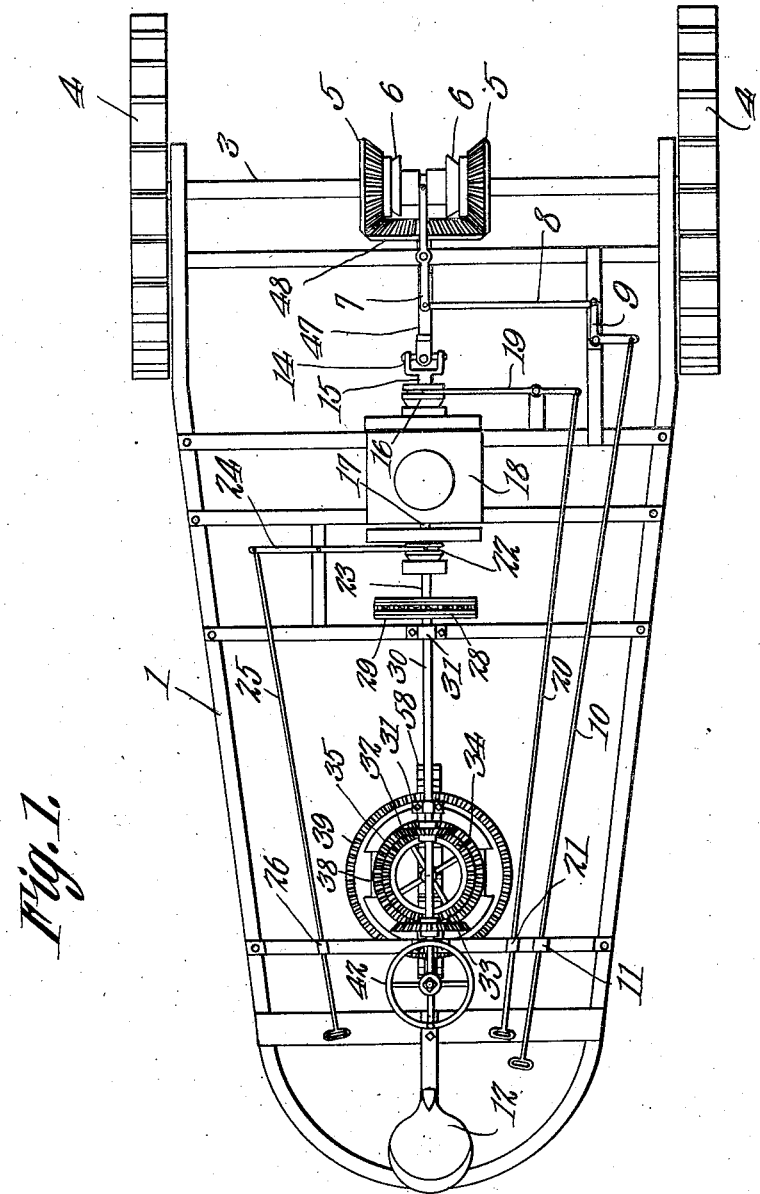

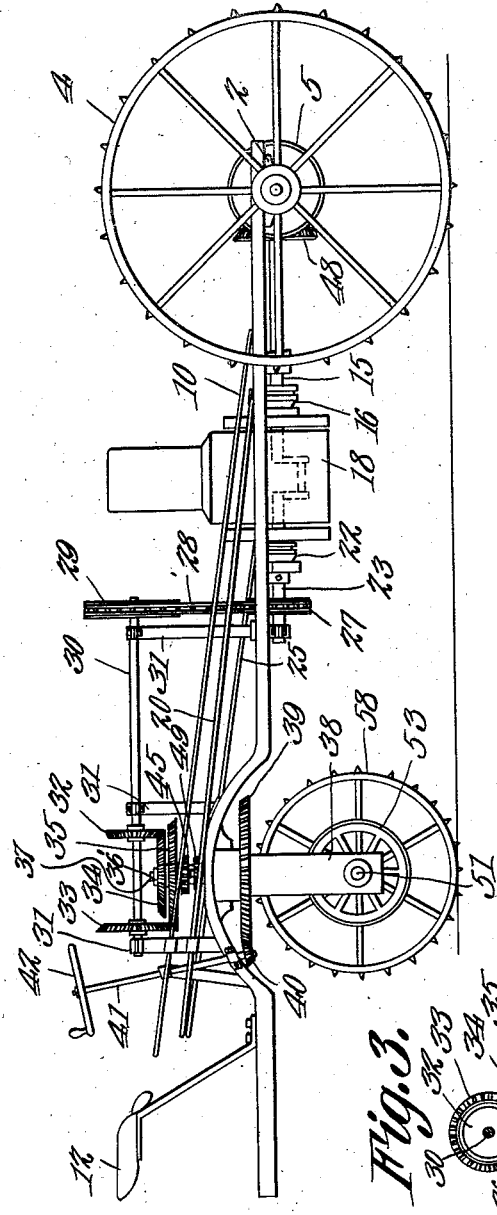

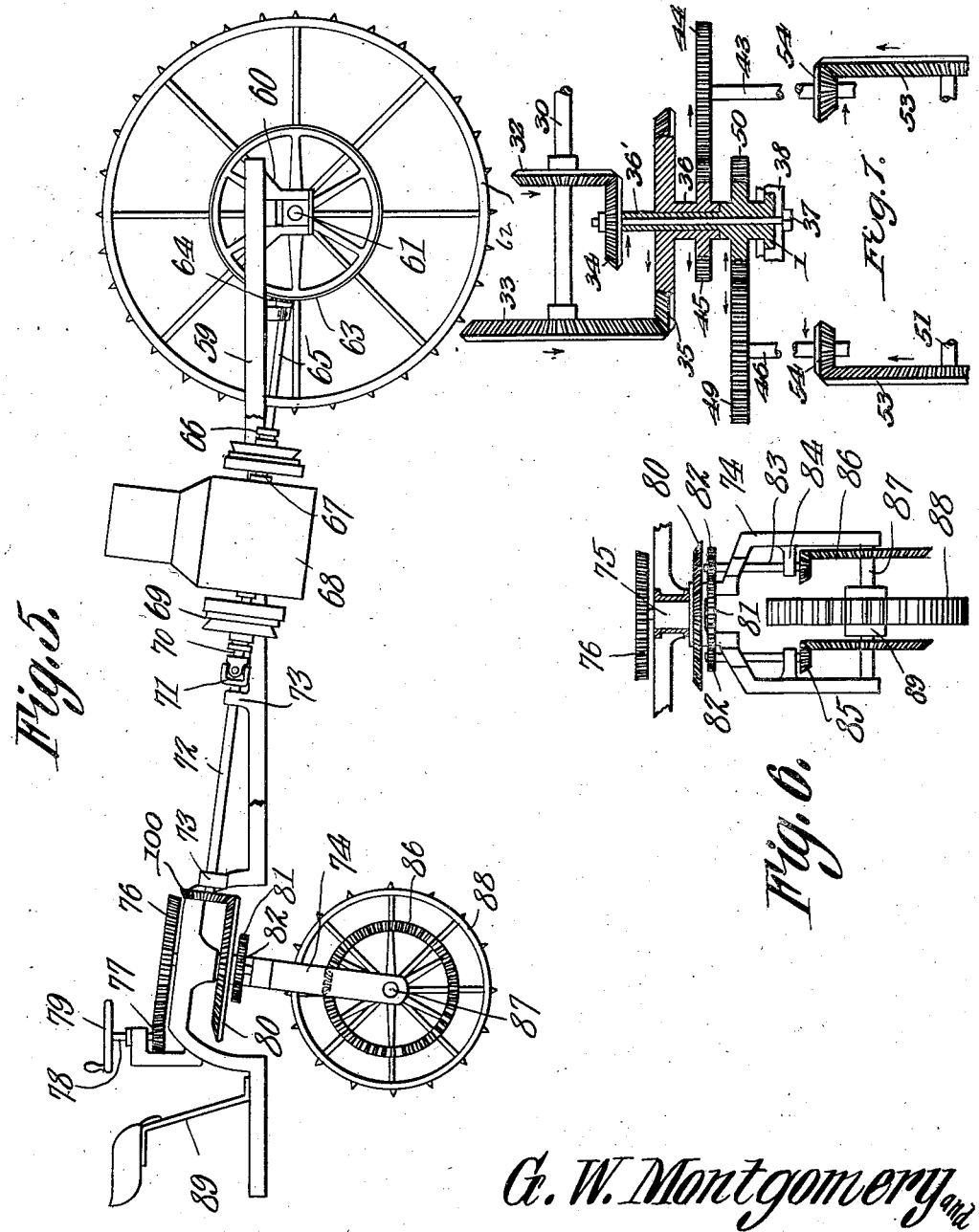

GEORGE WASHINGTON MONTGOMERY AND MARK D. BOWMAN, OF SPRINGBORO, PENNSYLVANIA.

TRACTION-ENGINE.

1,191,333.　　　Specification of Letters Patent.　　Patented July 18, 1916.

Application filed January 15, 1915. Serial No. 2,435.

*To all whom it may concern:*

Be it known that we, GEORGE W. MONTGOMERY and MARK D. BOWMAN, citizens of the United States, residing at Springboro, in the county of Crawford and State of Pennsylvania, have invented a new and useful Traction-Engine, of which the following is a specification.

The device forming the subject matter of this application is an agricultural implement, and the invention aims to provide a novel driving mechanism for the implement, and to provide a novel steering mechanism therefor.

It is within the scope of the invention to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings Figure 1 is a top plan; Fig. 2 is a side elevation; Fig. 3 is a fragmental elevation of the mechanism whereby the rear wheel is actuated and controlled; Fig. 4 is a sectional detail illustrating a portion of the driving mechanism; Fig. 5 is an elevation showing a modified form of the invention; Fig. 6 is an elevation illustrating a portion of the mechanism whereby the rear wheel is driven in that form of the invention which is disclosed in Fig. 5; Fig. 7 is a diagrammatic elevation illustrating the gear trains in that form of the invention shown in Fig. 1.

In carrying out the invention and referring particularly to Figs. 1, 2, 3 and 4, there is provided a frame denoted generally by the numeral 1, the same carrying bearings 2 in which is journaled for rotation, an axle 3 carrying ground wheels 4. Mounted to rotate on the axle 3 are beveled pinions 5 which may be coupled selectively with the axle 3 by means of clutches 6 actuated by a lever 7 fulcrumed intermediate its ends on the frame. Connected pivotally with the rear end of the lever 7 is a laterally extended link 8 pivoted to a bell crank 9 fulcrumed on the frame 1, there being a controlling member preferably in the form of a rod 10 pivoted to the bell crank 9, the rod 10 being forwardly extended through a guide 11 on the frame 1, the rod 10 terminating adjacent a seat 12 supported in any desired manner on the frame 1.

By means of a universal joint 14, a shaft 47 journaled on the frame 1 is connected with a shaft 15 united by a clutch 16 with the shaft 17 of an engine 18 mounted on the frame 1. The clutch 16 is controlled by means of a lever 19 fulcrumed intermediate its ends on the frame, the lever 19 being pivotally connected with a rearwardly extended controlling member or rod 20 mounted to reciprocate in a guide 21 on the machine frame, the rod 20 terminating adjacent the seat 12. The shaft 47 carries a beveled pinion 48 which meshes into the beveled pinion 5, the latter being loose on the axle 3 and being adapted to be coupled thereto selectively by means of the clutches 6 as hereinbefore mentioned.

By means of a clutch 22, the engine shaft 17 may be coupled to a short shaft 23 journaled for rotation on the frame 1. The clutch 22 is controlled by a lever 24 fulcrumed intermediate its ends onto the frame, the lever 24 being actuated by means of a rod 25 mounted to reciprocate in a guide 26 on the machine frame, the rod 25 terminating adjacent the seat 12. The shaft 23 carries a sprocket wheel 27 about which is trained a sprocket chain 28, the latter engaging a sprocket wheel 29 on a shaft 30 journaled for rotation in standards 31 on the machine frame. Secured to the shaft 30 is a beveled pinion 33 and a beveled pinion 32 is also secured to the shaft 30.

The invention includes a wheel carrying yoke 38 embodying a stud 37 which is journaled in the frame 1, to the end that the yoke may be rotated to effect a reversal of the rear wheel 58, as will be understood better when the description is proceeded with. Rotatably mounted upon the stud 37 are sleeves 36 and 36' carrying respectively a beveled pinion 35 and a beveled pinion 34. The beveled pinion 35 meshes into the beveled pinion 33 on the shaft 30 and the beveled pinion 34 meshes into the beveled pinion 32 on the shaft 30. Secured to the yoke 38 is a relatively large beveled pinion 39 adapted to be engaged by a beveled pinion 40 secured to the lower end of a steering shaft 41 journaled for rotation on the frame of the machine and provided at its upper end with a hand wheel 42 located adjacent the seat 12.

Journaled for rotation in the yoke 38 is an upright shaft 43 to the upper end of which is secured a pinion 44 meshing into a pinion 45 secured to the sleeve 36. Journaled for rotation in the yoke 38 is an upright shaft 46 to the upper end of which is secured a pinion 49 meshing into a pinion 50 secured to the sleeve 36'. Journaled for rotation in the yoke 38 adjacent its lower end, is an axle 51 rotating in bearings 52 which receive the lower ends of the shafts 43 and 46. Mounted on the axle 51 are beveled pinions 53 meshing into beveled pinions 54 secured to the shafts 46 and 43. The hubs of the ground wheel are denoted in Fig. 4 by the reference character 55 and these hubs 55 carry pawls 56 adapted to coact with the ratchet wheels 57 secured to the axle 51.

By means of the clutches 6, the beveled pinions 5 may be coupled up selectively with the axle 3, so as to rotate the axle 3 in one direction or the other. Rotation is imparted to the beveled pinions 5 by means of the beveled pinion 48, the shaft 47, the universal joint 14, the shaft 15, the clutch 16 and the engine shaft 17. Obviously, when desired, the clutch 16 may be shifted by means of the lever 19 and the actuating rod 20. The actuating rod 10, the bell crank 9 and the link 8, in combination with the lever 7 serve to shift the clutches 6.

By means of the rod 25 and the lever 24, the clutch 22 may be employed to couple up the engine shaft 17 with the shaft 23 and then there is established a driving train comprising the engine shaft 17, the clutch 22, the shaft 23, the sprocket wheel 27, the chain 28, the sprocket wheel 29 and the shaft 30. From the shaft 30 motion is transmitted to the rotatable sleeves 36 and 36' by way of the beveled pinion 32 and the beveled pinion 34 upon the one hand, and the beveled pinion 33 and the beveled pinion 35 upon the other hand. When the sleeves 36 and 36' thus are rotated, rotation is imparted to the shaft 43 by means of the intermeshing pinions 44 and 45, rotation being imparted to the shaft 46 by means of the intermeshing pinions 50 and 49. When the shafts 43 and 46 are rotated, these shafts through the medium of the intermeshing beveled pinions 54 and 53 will rotate the axle 51 and the rear ground wheel 58 which is secured thereto, the function of the pawl and ratchet mechanism 56—57 being obvious. The elements 56 and 57 coöperate to permit a driving of the ground wheel 58, but permit a rearward rotation of the ground wheel 58 independently of the driving mechanism.

The shaft 41 may be rotated by means of the hand wheel 42, the beveled pinion 40 meshing into the beveled pinion 39 and serving to effect a rotation of the yoke 38 which carries the ground wheel 58. In this manner, the vehicle may be steered and it is to be noted that if the yoke 38 is rotated through an angle of 180 degrees, a reversal in the direction of movement of the entire structure may be brought about without reversing the engine 18. The pinions 32 and 34 upon the one hand and 33 and 35 upon the other hand serve to transmit the driving effort into the ground wheel 58 and intermediate mechanisms. In this connection, it may be noted that the yoke 38 may be reversed in the manner hereinbefore set forth, through the medium of the shaft 41, without interfering with the engagement between the bevel pinions 32 and 34 and 33 35.

In Figs. 5 and 6 of the drawings, the vehicle frame is denoted by the numeral 59 and is provided with bearings 60 receiving an axle 61 carrying ground wheels 62. Attached to the axle 61 is a bevel pinion 63 meshing into a bevel pinion 64 secured to a shaft 65 journaled on the frame, and connected by means of a clutch 66 with the shaft 67 of an engine 68. By means of a clutch 69, the shaft 67 of the engine 68 is connected with a short shaft 70 united by means of a universal joint 71 with a shaft 72 journaled for rotation in bearings 73 on the frame.

The invention includes a yoke 74 comprising a stem 75 journaled in the frame, the stem 75 being provided with a beveled pinion 76 meshing into a pinion 77 secured to a shaft 78 journaled for rotation in the frame and provided with a hand wheel 79. Mounted to rotate on the yoke 74 is a beveled pinion 80 meshing into a beveled pinion 100 attached to the shaft 72. Connected operatively with the beveled pinion 80 to move therewith, is a gear wheel 81 meshing into gear wheels 82, attached to the upper ends of shafts 83, journaled for rotation in projections 84 on the yoke 74. Attached to the lower ends of the shafts 83 are beveled pinions 85 meshing into beveled pinions 86 attached to an axle 87 journaled in the yoke 74, the axle 87 being provided with a ground wheel 88, the ground wheel 88 being connected operatively with the axle 87 by means of pawl and ratchet mechanisms 89 of the sort hereinbefore alluded to.

The seat is denoted by the numeral 89 and is located relatively near to the hand wheel 79 so that the latter may be operated conveniently from the seat.

As will be understood readily, a steering of the ground wheel 88 and a reversal thereof, when desired, may be effected through a driving train comprising the hand wheel 79 the shaft 78, the pinion 77 and the pinion 76. The drive to the front wheels from the engine 68 takes place through the shaft 67, the clutch 66, the shaft 65, the beveled pinion 64 and the beveled pinion 63. The drive from the engine 68 to the rear ground wheel 88 takes place through the clutch 69, the shaft 70, the joint 71, the shaft 72, the beveled pinion 100, the beveled pinion 80, the gear wheels 82, the shafts 83, the beveled pinions 85, the beveled pinions 86 and pawl and ratchet mechanisms 89.

Having thus described the invention, what is claimed is:—

In a device of the class described, a frame; a forward shaft extended longitudinally of the frame and journaled thereon; a rear shaft extended longitudinally of the frame and journaled thereon; an engine operatively connected with both shafts; a yoke mounted to rotate on the forward end of the frame; a ground wheel carried by the yoke; means for operatively connecting the forward shaft with the ground wheel to rotate the ground wheel independently of the position of the yoke; a rear axle journaled in the frame; ground wheels carried by the rear axle; beveled pinions mounted to rotate on the rear axle; means for selectively coupling the beveled pinions to the rear axle; and a beveled pinion on the rear shaft and meshing into both beveled pinions.

In testimony that we claim the foregoing as our own, we have hereto affixed our signatures in the presence of two witnesses.

GEORGE WASHINGTON MONTGOMERY.
MARK D. BOWMAN.

Witnesses:
OTIS S. QUINBY,
F. C. GRAVES.